(12) United States Patent
Iwase

(10) Patent No.: US 9,008,927 B2
(45) Date of Patent: Apr. 14, 2015

(54) DRIVING FORCE CONTROLLING APPARATUS FOR VEHICLE

(75) Inventor: Yuji Iwase, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 930 days.

(21) Appl. No.: 12/999,146

(22) PCT Filed: Apr. 9, 2010

(86) PCT No.: PCT/JP2010/056454
§ 371 (c)(1),
(2), (4) Date: Dec. 15, 2010

(87) PCT Pub. No.: WO2011/125222
PCT Pub. Date: Oct. 13, 2011

(65) Prior Publication Data
US 2011/0251764 A1    Oct. 13, 2011

(51) Int. Cl.
*B60W 10/10* (2012.01)
*B60W 10/04* (2006.01)
(Continued)

(52) U.S. Cl.
CPC ............ *B60K 6/445* (2013.01); *Y10T 74/19051* (2015.01); *B60L 11/123* (2013.01); *B60L 11/14* (2013.01); *B60L 15/20* (2013.01); *B60L 2270/145* (2013.01); *B60W 10/06* (2013.01); *B60W 10/08* (2013.01); *B60W 30/20* (2013.01); *F02D 29/02* (2013.01); *F16H 57/0006* (2013.01); *Y02T 10/6217* (2013.01); *Y02T 10/6239* (2013.01); *Y02T 10/6286* (2013.01);
(Continued)

(58) Field of Classification Search
CPC ...... B60W 20/10; B60W 10/06; B60W 10/08
USPC ............................................................ 701/54
See application file for complete search history.

(56) References Cited

U.S. PATENT DOCUMENTS

| 2005/0245349 A1 | 11/2005 | Tabata et al. |
| 2005/0247503 A1 | 11/2005 | Imazu |
| 2008/0318726 A1 * | 12/2008 | Matsubara et al. ............... 477/3 |

FOREIGN PATENT DOCUMENTS

| EP | 1 396 368 B1 | 7/2008 |
| JP | 2001 97058 | 4/2001 |

(Continued)

OTHER PUBLICATIONS

Japanese Office Action issued on May 22, 2012, in patent Application No. 2010-539652 with partial English translation.

(Continued)

*Primary Examiner* — Redhwan K Mawari
*Assistant Examiner* — Rodney P King
(74) *Attorney, Agent, or Firm* — Oblon, McClelland, Maier & Neustadt, L.L.P.

(57) ABSTRACT

A driving force controlling apparatus for a vehicle incorporates an engine and a second motor generator and defines a first engaging unit by engaging a counter drive gear, which is able to output power from the engine, with a final gear; and a second engaging unit by engaging a counter drive gear, which is able to output power from the second motor generator, with the final gear. The power from the driving source (the engine or the second motor generator) in whichever of the first engaging unit and second engaging unit has greater vibration is decreased, whereas the power from the driving source (the engine or the second motor generator) in the engaging unit having less vibration is increased.

12 Claims, 4 Drawing Sheets

(51) Int. Cl.
*B60W 30/18* (2012.01)
*F16H 37/06* (2006.01)
*B60K 6/445* (2007.10)
*B60L 11/12* (2006.01)
*B60L 11/14* (2006.01)
*B60L 15/20* (2006.01)
*B60W 10/06* (2006.01)
*B60W 10/08* (2006.01)
*B60W 30/20* (2006.01)
*F02D 29/02* (2006.01)
*F16H 57/00* (2012.01)

(52) U.S. Cl.
CPC .......... *Y02T 10/7077* (2013.01); *Y02T 10/7275* (2013.01)

(56) References Cited

FOREIGN PATENT DOCUMENTS

| | | |
|---|---|---|
| JP | 2004 147491 | 5/2004 |
| JP | 2004-169842 | 6/2004 |
| JP | 2006-315358 | 11/2005 |
| JP | 2008 7045 | 1/2008 |

OTHER PUBLICATIONS

International Search Report issued May 18, 2010 in PCT/JP10/056454 filed Apr. 9, 2010.

\* cited by examiner

DRIVING FORCE CONTROLLING APPARATUS FOR VEHICLE

FIELD

The present invention relates to a driving force controlling apparatus for vehicle.

BACKGROUND

A hybrid vehicle incorporating an internal combustion engine and a motor as driving sources controls the driving and stopping of the engine and electric motor according to the running state, thereby driving the wheels by use of the torque of only the electric motor or driving the wheels by use of the torques of both the engine and electric motor.

For example, a hybrid driving device, described in Patent Document 1 specified below, has separately a first power transmission device for transmitting power from an engine to a counter shaft via a power distribution mechanism and a second power transmission device for transmitting power from a second motor generator to the counter shaft. This hybrid driving device appropriately sets a transmission gear ratio of each transmission device, thereby decreasing energy loss in high speed running, without degrading gradient performance.

CITATION LIST

Patent Literature

Patent Document 1: Japanese Patent Application Laid-open No. 2001-097058

SUMMARY

Technical Problem

The foregoing conventional hybrid driving device has the first power transmission device for transmitting power from the engine to the driving wheels, and the second power transmission device for transmitting power from the second motor generator to the driving wheels. Therefore, a second driven gear forming the second power transmission device engages the counter shaft, and a first driven gear forming the first power transmission device is firmly inserted into the engaging unit of the second driven gear. Even though the first driven gear and second driven gear form a single rotary body, two engaging units are defined. In this case, the rotary body formed from the first and second driven gears receives power input from the two engaging units. This leads to the problem that forceful power increases and noise resulting from vibration increase.

The present invention has been proposed in view of the forgoing problem. Accordingly it is an object of the present invention to provide a driving force controlling apparatus for a vehicle which can suppress noise emitted at engaging units.

Solution to Problem

A driving force controlling apparatus for a vehicle according to the present invention includes a first driving source, a first output gear which is able to output power from the first driving source, a second driving source, a second output gear which is able to output power from the second driving source, a third output gear which is able to output power to a driving wheel, a first engaging unit where the first output gear engages the third output gear, a second engaging unit where the second output gear engages the third output gear, and an output adjusting unit that decreases power from the driving source in whichever of the first and second engaging units has greater vibration while increasing power from the driving source in the engaging unit having less vibration.

In the driving force controlling apparatus for the vehicle as described above, preferably, when the vibration at the first engaging unit or the second engaging unit exceeds a preset upper limit, the output adjusting unit decreases the power from the driving source in the engaging unit having the greater vibration.

In the driving force controlling apparatus for the vehicle as described above, preferably, when the vibration at the first engaging unit or second engaging unit exceeds the preset upper limit, the output adjusting unit increases the power from the driving source in the engaging unit having less vibration within a range of frequency lower than the upper limit.

In the driving force controlling apparatus for the vehicle as described above, when the vibration at the first engaging unit or second engaging unit exceeds the preset upper limit, the output adjusting unit decreases the power from the driving source in the engaging unit having the greater vibration within a range higher than a preset lower limit where occurrence of discomfiting sound is prevented.

In the driving force controlling apparatus for the vehicle as described above, when vibration at the first engaging unit or second engaging unit exceeds the preset upper limit, the output adjusting unit changes the power from the first driving source and the power from the second driving source so that output from the third output gear does not change.

In the driving force controlling apparatus for the vehicle as described above, the output adjusting unit has a vibration generation map corresponding to a vehicle speed and torque at each of the engaging units, and changes the power from the first driving source and the power from the second driving source based on the vibration generation map.

Advantageous Effects of Invention

The driving force controlling apparatus for the vehicle according to the invention decreases the power from the driving source in whichever of the first engaging and second engaging units has the greater vibration while increasing the power from the driving source in the engaging unit having the less vibration. Accordingly, the present invention is effective to suppress noises emitted at the first and second engaging units.

DESCRIPTION OF EMBODIMENTS

Embodiments of a driving force controlling apparatus for a vehicle according to the present invention will now be described in detail with reference to the drawings. It is to be understood that the invention is not limited to the embodiments thereof.

[First Embodiment]

Figure 1:
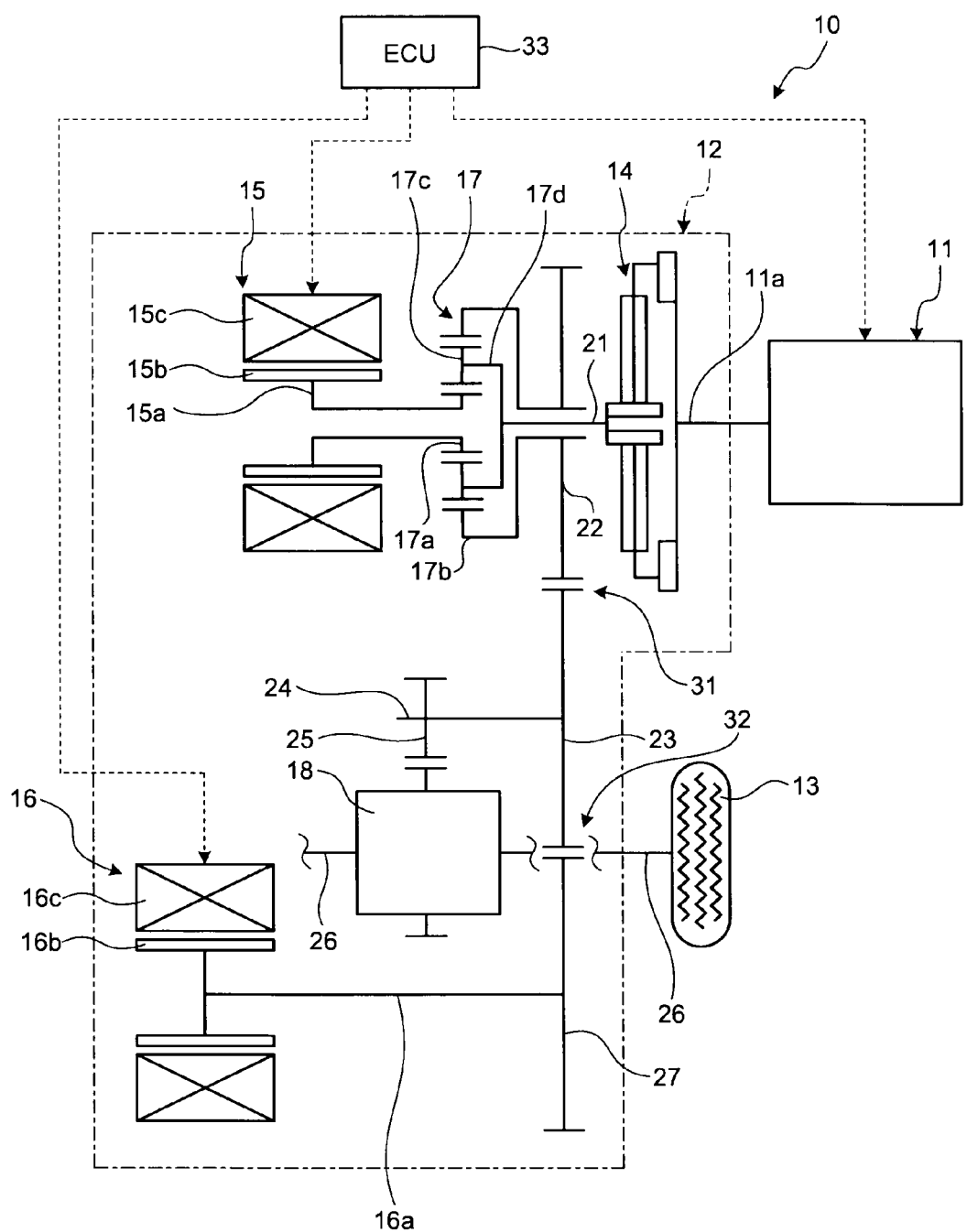
FIG. 1 is a schematic view of the configuration of a hybrid vehicle incorporating a driving force controlling apparatus for a vehicle according to a first embodiment of the present invention.
Figure 2:
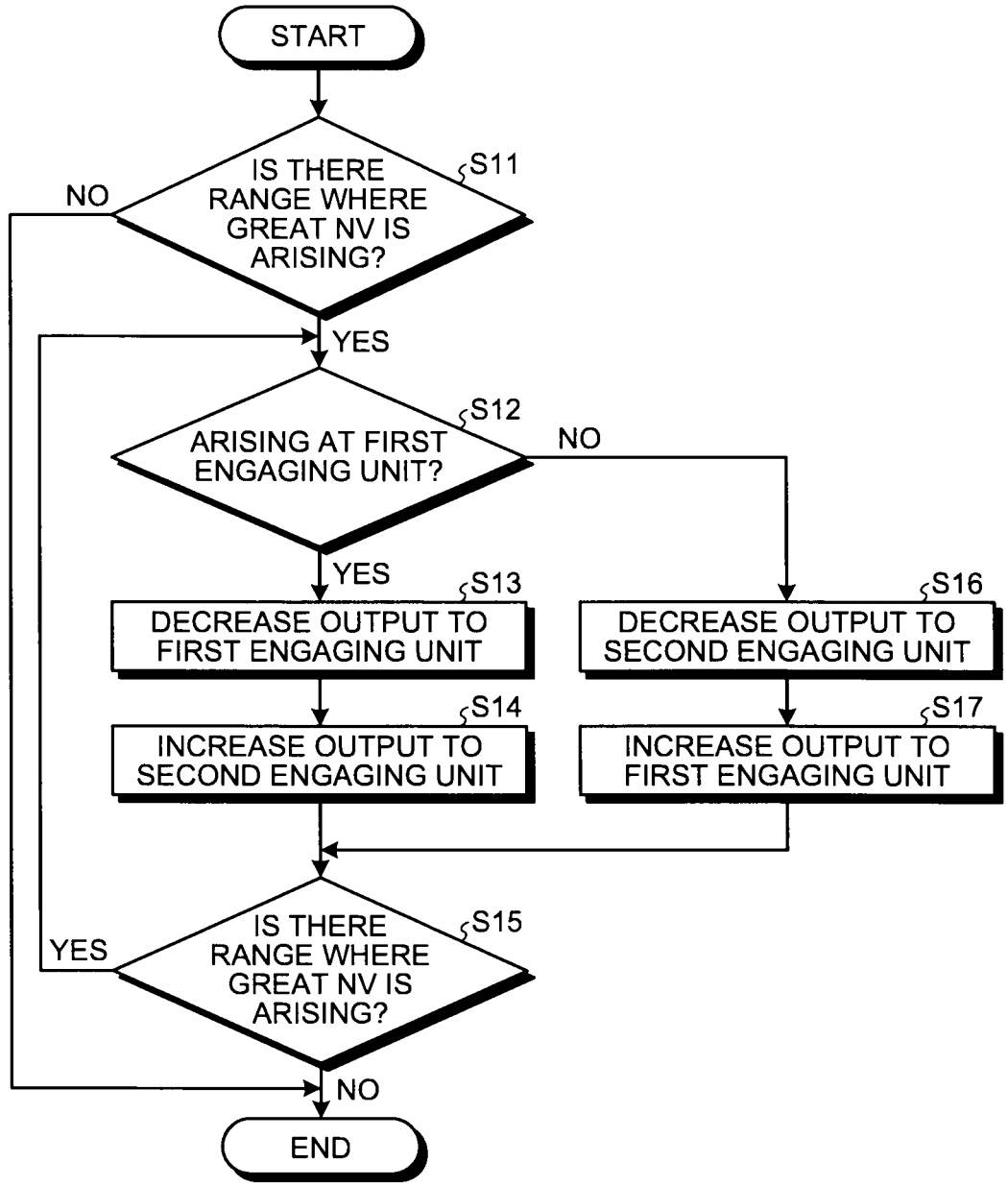
FIG. 2 is a flowchart illustrating control exerted by the driving force controlling apparatus for the vehicle according to the first embodiment.
Figure 3:
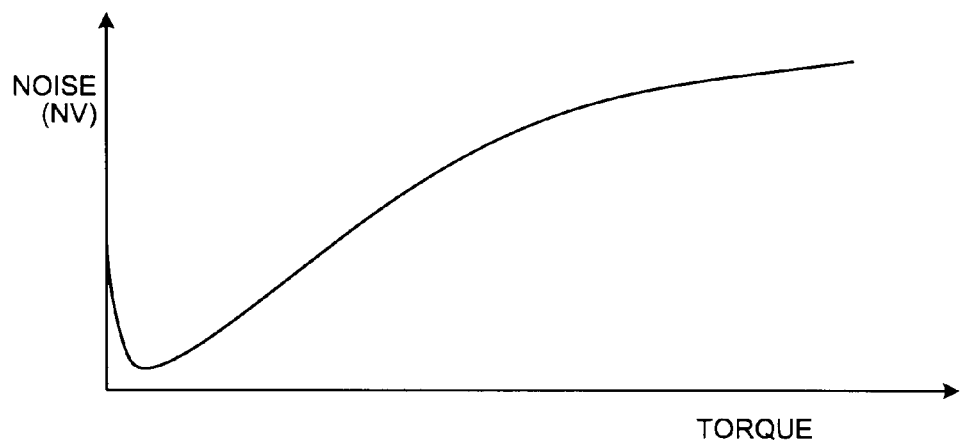
FIG. 3 is a graph illustrating noise relative to torque generated at each engaging unit.
Figure 4:
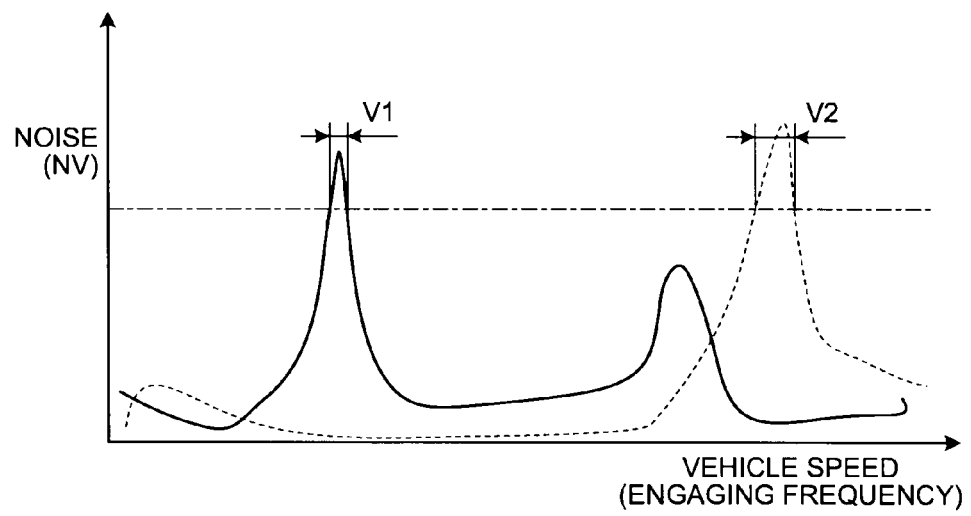
FIG. 4 is a graph representing noise emitted at each engaging unit, relative to the vehicle.

FIG. 1 is a schematic view of the configuration of a hybrid vehicle incorporating a driving force controlling apparatus for a vehicle according to the first embodiment of the present invention. FIG. 2 is a flowchart illustrating the control exerted by the driving force controlling apparatus for the vehicle according to the first embodiment. FIG. 3 is a graph illustrating noise relative to torque generated at each engaging unit, and FIG. 4 is a graph representing noise emitted at each engaging unit, relative to the vehicle speed.

As illustrated in FIG. 1, in the first embodiment of a hybrid vehicle 10 incorporating the driving force controlling apparatus for the vehicle according to the present invention, reference numeral 11 represents an engine (internal combustion engine) serving as a first driving force; reference numeral 12 represents a transmission accelerator; and reference numeral 13 represents a driving wheel 13. When a crankshaft 11a, which is an output shaft for the engine 11, is rotated and driven, its power is transmitted to each driving wheel 13 via the transmission accelerator 12. The hybrid vehicle 10 can be moved forward or backward by rotation of the driving wheels 13.

The transmission accelerator 12 includes: a damper 14; a first motor generator (MG1) 15 that functions mainly as a power generator; a second motor generator (MG2) 16 that functions mainly as a motor; a power distribution mechanism 17; and a differential (differential gear) 18.

The first motor generator 15 includes: a rotor shaft 15a disposed on the same axis as an input shaft 21; a rotor 15b externally fixed to the rotor shaft 15a; and a stator 15c fixed to the case of the transmission accelerator 12 so as to be opposite the rotor 15b without touching the rotor 15b. The second motor generator 16 includes: a rotor shaft 16a disposed parallel to the input shaft 21; a rotor 16b fixed to the rotor shaft 16a; and a stator 16c fixed to the case of the transmission accelerator 12 so as to be opposite the rotor 16b without touching the rotor 16b.

The power distribution mechanism 17, configured to have a planetary gear mechanism of a single pinion type, includes: a sun gear 17a, which is an external gear; a ring gear 17b, which is an internal gear; a plurality of pinion gears 17c; and a carrier 17d. The power distribution mechanism 17 transmits power output from the engine 11 to the first motor generator 15 or to the differential 18. In addition to the function of distributing power from the engine 11, this power distribution mechanism 17 also functions as a transmission mechanism and controls the power from the engine 11 so that predetermined speed ratios and torques are obtained.

In this power distribution mechanism 17, driving force output from the engine 11 can be transmitted from the damper 14, via the input shaft 21, the carrier 17d, the pinion gears 17c, and the sun gear 17a, to the first motor generator 15. Additionally, the power distribution mechanism 17 can transmit driving force output from the engine 11, from the damper 14, via the input shaft 21, the carrier 17d, the pinion gears 17c, the ring gear 17b, a counter drive gear 22, a counter driven gear 23, and a drive pinion shaft 24, to a final gear 25 and further to the differential 18. The differential 18 is of two pinion type, and configured such that according to necessity, power input from the final gear 25 is distributed and transmitted to each of the driving wheels 13, left and right, via a drive shaft 26.

Thus configured, the hybrid vehicle 10 according to the first embodiment incorporates the engine 11 serving as a first driving source according to the present invention, and its power is output from the counter drive gear 22 serving as a first output gear. This hybrid vehicle 10 also has the second motor generator 16 serving as a second driving source according to the present invention, and its power is output from another counter drive gear 27, serving as a second output gear. The hybrid vehicle 10 has the final gear 25 serving as a third output gear, which is able to output power from the engine 11 or the second motor generator 16 to each driving wheel 13. The counter drive gear 22 engages the final gear 25, thereby defining a first engaging unit 31, whereas the counter drive gear 27 engages the final gear 25, thereby defining a second engaging unit 32.

The power from the engine 11, the first motor generator 15, and the second motor generator 16 is adjusted by an electronic control unit (ECU) 33. Based on the output required by a driver and the running state of the vehicle, the electronic control unit (ECU) 33 controls torques output from the engine 11 and the second motor generator 16, and thereby controls the torque that drives driving wheels 13. The ECU 33 changes the amount of fuel to be injected and the ignition timing, thereby adjusting torque output from the engine 11, and changes the amount of electric power to be supplied, thereby adjusting torque output from the second motor generator 16. Based on the running state of the vehicle, the ECU 33 also controls the power distribution mechanism 17, thereby controlling the amount of power generated by the first motor generator 15.

The hybrid vehicle 10 according to the first embodiment uses the engine 11 and the second motor generator 16 as two driving sources. Therefore, the hybrid vehicle 10 has two driving force transmission paths from the corresponding driving sources to the driving wheels 13, such that the final gear 25 engages the two counter drive gears 22 and 27 and hence two engaging units 31 and 32 are defined. As a result, the final gear 25 is subjected to power input from the two engaging units 31 and 32, leading to an increase in forceful power. Consequently, loud noise may be emitted due to vibration.

In order to prevent the foregoing problem in the driving force controlling apparatus for the vehicle according to the first embodiment, the ECU 33 serving as an output adjusting unit of the present invention decreases the power from the driving source (the engine 11 or the second motor generator 16) in whichever of the first engaging unit 31 and the second engaging unit 32 that has the greater vibration whereas the ECU 33 increases the power from the driving source (the engine 11 or the second motor generator 16) in the engaging unit with the less vibration.

In this case, if the vibration of the first engaging unit 31 or the second engaging unit 32 is greater than a preset upper limit, the ECU 33 decreases the power from the driving source corresponding to the engaging unit with the greater frequency. Also, if the vibration of the first engaging unit 31 or the second engaging unit 32 is greater than the upper limit, the ECU 33 increases the power from the driving source corresponding to the engaging unit with the less vibration within the range of frequencies lower than the upper limit.

Additionally, if the vibration of the first engaging unit 31 or the second engaging unit 32 is greater than the upper limit, the ECU 33 changes the power from each driving source so as to prevent any change in the output from the final gear 25 to the driving wheel 13. Specifically, the ECU 33 increases or decreases the power from the engine 11 and the second motor generator 16 within the range where the sum of the powers from the engine 11 and the second motor generator 16 does not change.

The ECU 33 has a vibration generation map corresponding to vehicle speed and torque at each of the engaging units 31 and 32, and changes the power from each driving source based on the vibration generation map.

Specifically, it has been found by experiment and the like that if the torque at each of the engaging units 31 and 32 of the final gear 25 and the counter drive gears 22 and 27 respectively increases, as shown in FIG. 3, noise (actually, NV, noise resulting from vibration: Noise Vibration) emitted at each engaging unit 31, 32 increases. As shown in FIG. 4, noise emitted at each engaging unit 31, 32 changes according to vehicle speed, that is, the number of revolutions (engaging frequency) of the final gear 25. In FIG. 4, noise emitted at the first engaging unit 31 and the second engaging unit 32 are represented by a solid line and a dotted line respectively. For instance, if the upper limit of the noise emitted at each engaging unit 31, 32 is represented by a line of alternate long and short dashes in FIG. 4, noise emitted at the first engaging unit 31 exceeds the upper limit in a vehicle speed range V1 whereas noise emitted at the second engaging unit 32 exceeds the upper limit in a vehicle speed range V2. In this case, the upper limit of the noise is determined by taking account of driver comfort, the durability of each gear 22, 25, 27, etc.

The ECU 33 stores a vibration generation map as shown in FIG. 4. Since the vibration generation map differs according to the configuration of each engaging unit 31, 32, it is set in advance based on an experiment (vehicle running test) or the like. In particular, the respective rigidities at which counter drive gears 22 and 27 are supported by the case of the transmission accelerator 12 are different from each other, making the counter drive gears 22 and 27 different in frequency characteristic and hence frequency of vibration. Therefore, using the vibration generation map according to the vehicle running state (e.g., vehicle speed), the power from the engine 11 and the second motor generator 16 is decreased so that noise at each engaging unit 31, 32 is softer than the upper limit. In this case, the relations between the torques of the engine 11 and the second motor generator 16 and noise are apparent from the graph shown in FIG. 3. Accordingly, the graph in FIG. 3 may be mapped and stored. Incidentally, a three-dimensional map representing the relations between the torque at each engaging unit 31, 32, the vehicle speed (the number of revolutions), and noise may be used.

In this case, the ECU 33 has to prevent any change in torque output from the final gear 25 to each driving wheel 13. For example, if noise exceeding the upper limit is emitted in the vehicle speed range V1 in FIG. 4, torque output from the engine 11, which is the driving source for the first engaging unit 31 where loud noise emitted, is decreased. Thereby noise emitted at the first engaging unit 31 is brought below the upper limit. Meanwhile, torque output from the second motor generator 16, which is the driving source for the second engaging unit 32 where soft noise is emitted, is increased. In this case, although noise at the second engaging unit 32 becomes louder, it has to be kept below the upper limit. Specifically, in FIG. 4, noise (solid line) at the first engaging unit 31 exceeding the upper limit in the vehicle range V1 decreases whereas noise (dotted line) at the second engaging unit 32 increases.

On the other hand, if noise exceeding the upper limit is emitted in the vehicle range V2 in FIG. 4, torque output from the second motor generator 16, which is the driving source for the second engaging unit 32 where loud noise is emitted, is decreased. Thereby noise emitted at the second engaging unit 32 is brought below the upper limit. Meanwhile, torque output from the engine 11, which is the driving source for the first engaging unit 31 where soft noise is emitted, is increased. In this case, although noise at the first engaging unit 31 becomes louder, it has to be kept below the upper limit. Specifically, in FIG. 4, noise (dotted line) at the second engaging unit 32 exceeding the upper limit in the vehicle range V2 decreases whereas noise (solid line) at the first engaging unit 31 increases.

Driving force control by the driving force controlling apparatus for the vehicle according to the first embodiment will now be described in detail with reference to the flowchart in FIG. 2.

In driving force control by the driving force controlling apparatus for the vehicle according to the first embodiment, as shown in FIG. 2, the ECU 33 determines in step S11 whether there is a vehicle speed range where loud noise (great NV) exceeds the upper limit in either of the first engaging unit 31 and the second engaging unit 32. If the ECU 33 determines that no loud noise exceeding the upper limit is emitted (No), it terminates this routine without further activity.

On the other hand, in step S11, if the ECU 33 determines that there is a vehicle speed range where noise exceeding the upper limit is emitted at either of the first engaging unit 31 and the second engaging unit 32 (Yes), the ECU 33 determines in step S12 whether loud noise exceeding the upper limit is emitted at the first engaging unit 31. If the determination is made that noise exceeding the upper limit is emitted at the first engaging unit 31 (Yes), torque output from the engine 11 to the first engaging unit 31 is decreased in step S13. Then, torque output from the second motor generator 16 to the second engaging unit 32 is increased in step S14.

Consequently, noise emitted at the first engaging unit 31 decreases whereas noise emitted at the second engaging unit 32 increases. Nevertheless, vibration noise adversely affecting a driver is decreased, thereby improving NV performance.

If the ECU 33 determines that loud noise exceeding the upper limit is not emitted at the first engaging unit 31 in step S12 (No), torque output from the second motor generator 16 to the second engaging unit 32 is decreased in step S16. Then, torque output from the engine 11 to the first engaging unit 31 is increased in step S17.

Consequently, noise emitted at the second engaging unit 32 decreases whereas noise emitted at the first engaging unit 31 increases. Nevertheless, vibration noise adversely affecting a driver is decreased, thereby improving NV performance.

The ECU 33 determines in step S15 whether loud noise (great NV) exceeding the upper limit is emitted at either of the first engaging unit 31 and the second engaging unit 32. If the determination is made that loud noise is emitted (Yes), the ECU 33 returns to step S12 and repeats the process, and when the determination is made that loud noise is not emitted (No), the process is terminated.

Thus, the driving force controlling apparatus for the vehicle according to the first embodiment incorporates the engine 11 and the second motor generator 16 and defines the first engaging unit 31 by engaging the counter drive gear 22, which is able to output power from the engine 11, with the final gear 25; and the second engaging unit 32 by engaging the counter drive gear 27, which is able to output power from the second motor generator 16, with the final gear 25. The power from the driving source (the engine 11 or the second motor generator 16) in whichever of the first engaging unit 31 and the second engaging unit 32 makes the louder noise (greater vibration) is decreased, whereas the power from the driving source (the engine 11 or the second motor generator 16) in the engaging unit that makes the softer noise (less vibration) is increased.

Therefore, since torque output from the engaging unit 31 or 32 making the louder noise decreases, noise at this engaging unit decreases. Since torque output to the engaging unit 31 or 32 making the softer noise increases, noise at this engaging unit increases. However, noise is suppressed as a whole such that noises emitted at the first engaging unit 31 and the second engaging unit 32 are suppressed. This improves the mileage and prolongs the life of a battery, not shown, which supplies power to the second motor generator 16.

When noise at the first engaging unit 31 or the second engaging unit 32 exceeds the upper limit, the driving force controlling apparatus for the vehicle according to the first embodiment decreases power from the driving source at the engaging unit 31 or 32 making the louder noise. At this time, power from the driving source in the engaging unit 31 or 32 making the softer noise increases within a range where the noise is softer than the upper limit. Accordingly, noises emitted at the first engaging unit 31 and the second engaging unit 32 can be suppressed.

When noise in the first engaging unit 31 or the second engaging unit 32 exceeds the upper limit, the driving force controlling apparatus for the vehicle according to the first embodiment increases or decreases torque output from the engine 11 and torque output from the second motor generator 16 so as to prevent a change in output from the final gear 25 to each driving wheel 13. This prevents degradation in drivability since the changes in output torque of the hybrid vehicle 10, which might cause discomfort to the driver, do not occur.

The driving force controlling apparatus for the vehicle according to the first embodiment has vibration generation map corresponding to vehicle speed and toque at each engaging unit 31, 32, and increases or decreases torque output from the engine 11 and torque from the second motor generator 16 based on the vibration generation map. Accordingly, increases in the size and cost of the device can be contained without adding sensors or the like, and control can also be simplified.

[Second Embodiment]

Figure 5:
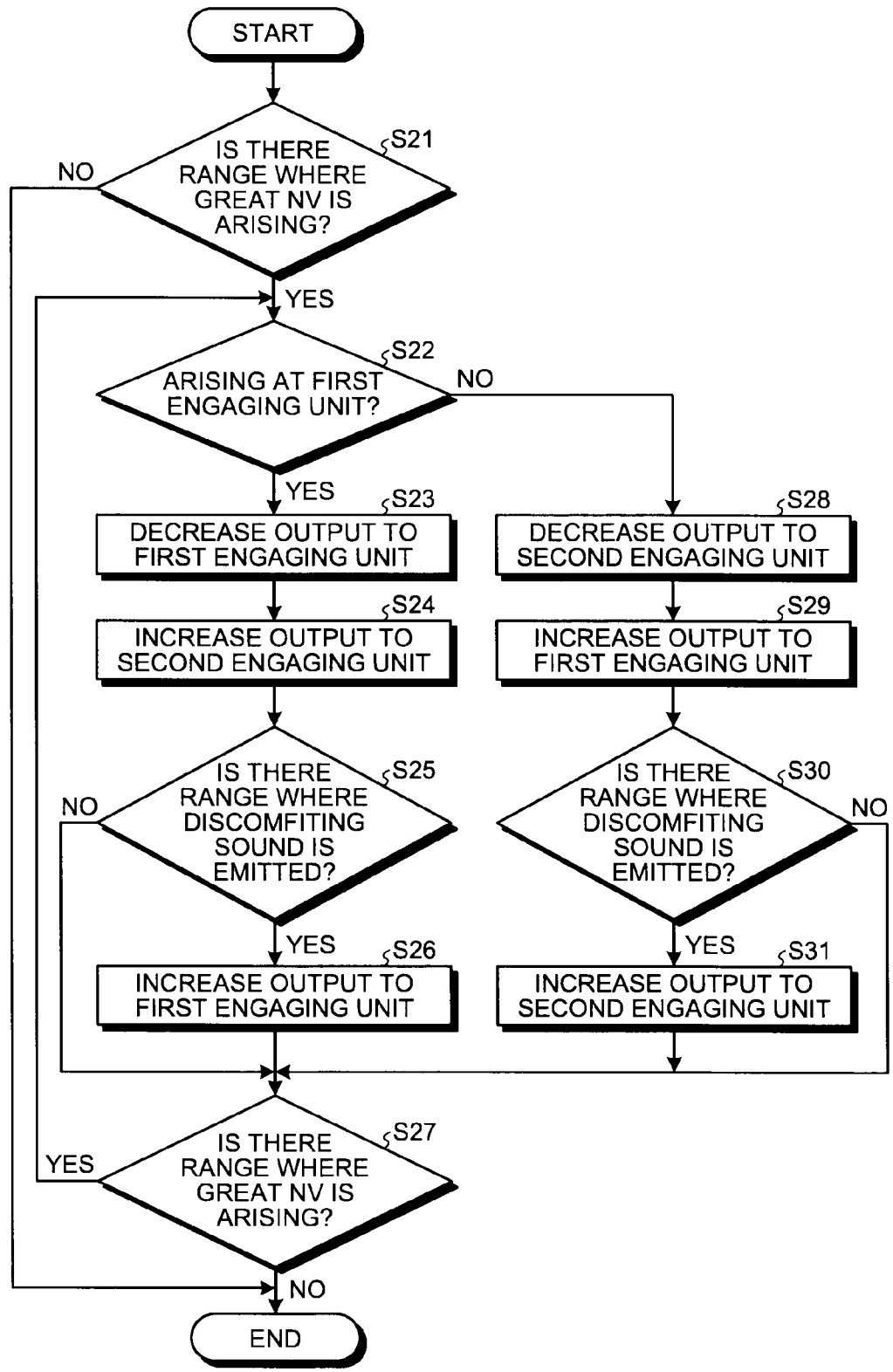
FIG. 5 is a flowchart illustrating control by a driving force controlling apparatus for a vehicle according to a second embodiment of the present invention.

FIG. 5 is a flowchart illustrating control exerted by a driving force controlling apparatus on a vehicle according to the second embodiment of the present invention. The basic configuration of the driving force controlling apparatus for the vehicle according to the present embodiment is substantially the same as that according to the foregoing first embodiment. A description will be given using FIG. 1, and components having functions similar to those in the first embodiment are labeled with the same signs and explanations thereof are omitted.

The driving force controlling apparatus for the vehicle according to the second embodiment exerts control in the same manner as the foregoing first embodiment, as shown in FIG. 1, such that the ECU 33 decreases the power from the driving source (the engine 11 or the second motor generator 16) in whichever of the first engaging unit 31 and the second engaging unit 32 has the greater vibration while increasing power from the driving source (the engine 11 or the second motor generator 16) in the engaging unit having the less vibration.

When vibration at the first engaging unit 31 or the second engaging unit 32 exceeds the preset upper limit, the ECU 33 decreases power from the driving source (the engine 11 or the second motor generator 16) in the engaging unit 31 or 32 with the greater vibration within a range higher than the preset lower limit where no discomfiting sound is emitted.

That is, when vibration at the second engaging unit 32 is high, power from the second motor generator 16, which serves as a driving source for the second engaging unit 32, is decreased, whereas power from the engine 11, which serves as a driving source for the first engaging unit 31 with the lower frequency, is increased. However, if power from the second motor generator 16 is decreased excessively, discomfiting sound may be emitted at the second engaging unit 32. Such discomfiting sound includes, the so-called rattling and idling sounds emitted between gears. The engine 11 burns fuel inside it, thereby causing an explosion, and converts heat energy thus generated into mechanical energy, thereby obtaining driving force. This explosion leads to a torque change (rotation vibration). This torque change is absorbed by the damper 14, thereby suppressing its transmission. However, when power from the second motor generator 16 decreases, the pressure of the tooth face of the counter drive gear 27 on the gear face of the final gear 25 decreases, with the result that, when even a minute change in torque in the engine 11 is transmitted to the final gear 25, a rattling or idling sound is more likely to occur between the gear faces of the counter drive gear 27 and the final gear 25.

In the driving force controlling apparatus for the vehicle according to the second embodiment, when vibration of the first engaging unit 31 or the second engaging unit 32 exceeds the upper limit and, therefore, power from the driving source (the engine 11 or the second motor generator 16) in the engaging unit 31 or 32 with the greater vibration is decreased in order to prevent the foregoing problem, power from this driving source is caused to fall within a range higher than the lower limit where the occurrence of rattling or idling sound is prevented.

In this case, the ECU 33 has a vibration generation map corresponding to the vehicle speed and the torque at each engaging unit 31, 32, and changes the power from each driving source based on the vibration generation map.

Specifically, it has been found by experiment or suchlike that if the torque at each of the engaging units 31 and 32 of the final gear 25 and the counter drive gears 22 and 27 respectively decreases, discomfiting sound (a rattling or idling sound) emitted at each engaging unit 31, 32 increases. Discomfiting sound emitted at each engaging unit 31, 32 changes according to the vehicle speed, that is, the number of the revolutions of the final gear 25.

The ECU 33 stores, for example, a three-dimensional vibration generation map representing the relations between the torque at each engaging unit 31, 32, the vehicle speed (the number of revolutions), and any discomfiting sound. Since the vibration generation map differs according to the configuration of each engaging unit 31, 32, it is set in advance based on an experiment (vehicle running test) or the like.

Driving force control by the driving force controlling apparatus for the vehicle according to the second embodiment will now be described in detail with reference to the flowchart in FIG. 5.

In the driving force control by the driving force controlling apparatus for the vehicle according to the second embodiment, as shown in FIG. 5, the ECU 33 determines in step S21 whether there is a vehicle speed range where loud noise (great NV) exceeds the upper limit at either of the first engaging unit 31 and the second engaging unit 32. If the ECU 33 determines that no noise exceeding the upper limit is emitted (No), it terminates this routine without further activity.

On the other hand, in step S21, if the ECU 33 determines that there is a vehicle speed range where noise exceeding the upper limit is emitted at either of the first engaging unit 31 and the second engaging unit 32 (Yes), the ECU determines in step S22 whether loud noise exceeding the upper limit is emitted at the first engaging unit 31. If a determination is made that noise exceeding the upper limit is emitted at the first engaging unit 31 (Yes), torque output from the engine 11 to the first engaging unit 31 is decreased in step S23. Then, torque output from the second motor generator 16 to the second engaging unit 32 is increased in step S24.

Consequently, noise emitted at the first engaging unit 31 decreases whereas noise emitted at the second engaging unit 32 increases. However, vibration noise adversely affecting a driver is decreased, thereby improving NV performance. Subsequently, the ECU 33 determines in step S25 whether there is a vehicle speed range where discomfiting sound (a rattling or idling sound) exceeding the lower limit is emitted at either of the first engaging unit 31 and the second engaging unit 32. If the ECU 33 determines that no discomfiting sound exceeding the lower limit is emitted (No), the ECU 33 proceeds to step S27.

On the other hand, in step 25, if the ECU 33 determines that there is a vehicle speed range where discomfiting sound exceeding the lower limit is emitted at the first engaging unit 31 (Yes), the ECU 33 increases the torque output from the engine 11 to the first engaging unit 31 in step S26, and then proceeds to step S27.

If the ECU 33 determines that noise exceeding the upper limit is not emitted at the first engaging unit 31 in step S22 (No), torque output from the second motor generator 16 to the second engaging unit 32 is decreased in step S28. Then, torque output from the engine 11 to the first engaging unit 31 is increased in step S29.

Consequently, noise emitted at the second engaging unit 32 decreases, whereas noise emitted at the first engaging unit 31 increases. However, vibration noise adversely affecting a driver is decreased, thereby improving NV performance. Then, the ECU 33 determines in step S30 whether there is a vehicle speed range where discomfiting sound (a rattling or idling sound) exceeding the lower limit is emitted at the second engaging unit 32. If the ECU 33 determines that no discomfiting sound exceeding the lower limit is emitted (No), the ECU 33 proceeds to step S27.

On the other hand, if the ECU 33 determines in step S30 that there is a vehicle speed range where discomfiting sound exceeding the lower limit is emitted at the second engaging unit 32 (Yes), the ECU 33 increases in step S31 the torque output from the second motor generator 16 to the second engaging unit 32, and then proceeds to step S27.

The ECU 33 determines in step S27 whether loud noise (great NV) exceeding the upper limit is emitted at either of the first engaging unit 31 and the second engaging unit 32. If a determination is made that loud noise is emitted (Yes), the ECU 33 returns to step S22 and repeats the process, and when a determination is made that loud noise is not emitted (No), the process is terminated.

As described above, the driving force controlling apparatus for the vehicle according to the second embodiment decreases power from the driving source (the engine 11 or the second motor generator 16) in whichever of the first engaging unit 31 and the second engaging unit 32 makes louder noise (greater vibration), whereas it increases power from the driving source (the engine 11 or the second motor generator 16) in the engaging unit making softer noise (less vibration). Additionally, when vibration at the first engaging unit 31 or the second engaging unit 32 exceeds the preset upper limit, power from the driving source at the engaging unit with the greater vibration is decreased within a range higher than the preset lower limit where occurrence of discomfiting sound is prevented.

Therefore, since torque output from the engaging unit 31 or 32 making louder noise decreases, noise at this engaging unit decreases. Since torque output to the engaging unit 31 or 32 making softer noise increases, noise at this engaging unit increases. However, noise is suppressed as a whole. When torque output to the engaging unit 31 or 32 making louder noise decreases, torque is caused to fall within the range where occurrence of discomfiting sound is prevented. Accordingly, emission of discomfiting sound at this engaging unit is suppressed. This suppresses discomfiting sound emitted at the first engaging unit 31 or the second engaging unit 32, can improve the mileage, and prolongs the life of a battery, not shown, which supplies power to the second motor generator 16.

In this case, a torque change (rotation vibration) resulting from an explosion arises in the engine 11 connected to the first engaging unit 31. This torque change is easily transmitted to the first engaging unit 31. Therefore, power from the second motor generator 16 connected to the second engaging unit 32 is decreased and power from the engine 11 connected to the first engaging unit 31 is increased. If power from the second motor generator 16 is decreased excessively in this case, discomfiting sound is more likely to occur at the second engaging unit 32. Accordingly, exerting control according to the present embodiment is effective to prevent this.

Each of the embodiments described above is provided with a vibration generation map corresponding to the running speed of the vehicle, the torque at each engaging unit 31, 32, the vehicle speed (the number of revolutions), etc; and the engine 11 and the second motor generator 16 are controlled based on the vibration generation map. However, the invention is not limited to this configuration. For example, a sensor for detecting vibration, discomfiting sound, or suchlike arising in each engaging unit 31, 32 may be provided and, based on the result detected by this sensor, the engine 11 and the second motor generator 16 may be controlled.

In each embodiment described above, explanation is given on the driving force controlling apparatus for the vehicle according to the present invention incorporated in the hybrid vehicle 10 including the engine 11 and the motor generators 15 and 16. However, the present invention may be used in a hybrid vehicle incorporating the engine 11 and only the second motor generator 16. In addition, the two driving sources are not limited to the engine and the electric motor. Furthermore, the present invention may be used in a vehicle incorporating three driving sources and having three or more engaging units.

Industrial Applicability

As described above, the driving force controlling apparatus for the vehicle according to the present invention appropriately suppresses noise emitted at its engaging units, by decreasing power from the driving source in the engaging unit with greater vibration while increasing power from the driving source at the engaging unit with less vibration. Accordingly, the present invention is useful in a device for controlling the driving force of a vehicle.

REFERENCE SIGNS LIST

10 HYBRID VEHICLE
11 ENGINE (INTERNAL COMBUSTION ENGINE, FIRST DRIVING SOURCE)
12 TRANSMISSION ACCELERATOR
13 DRIVING WHEEL
15 FIRST MOTOR GENERATOR
16 SECOND MOTOR GENERATOR (SECOND DRIVING SOURCE)

17 POWER DISTRIBUTION MECHANISM
18 DIFFERENTIAL (DIFFERENTIAL GEAR)
21 INPUT SHAFT
22 COUNTER DRIVE GEAR (FIRST OUTPUT GEAR)
23 COUNTER DRIVEN GEAR
24 DRIVE PINION SHAFT
25 FINAL GEAR (THIRD OUTPUT GEAR)
26 DRIVE SHAFT
27 COUNTER DRIVE GEAR (SECOND OUTPUT GEAR)
31 FIRST ENGAGING UNIT
32 SECOND ENGAGING UNIT
33 ELECTRONIC CONTROL UNIT, ECU (OUTPUT ADJUSTING UNIT)

The invention claimed is:

1. A driving force controlling apparatus for a vehicle comprising:
a first driving source which outputs power;
a first output gear which is able to output power from the first driving source;
a second driving source which outputs power;
a second output gear which is able to output power from the second driving source;
a third output gear which is able to output power to a driving wheel;
a first engaging unit where the first output gear meshes with the third output gear;
a second engaging unit where the second output gear meshes with the third output gear; and
an output adjusting unit that determines vibration of the first engaging unit and the second engaging unit and adjusts the power of the first driving source and the power of the second driving source, wherein
the output adjusting unit decreases power of the driving source in whichever of the first and second engaging units has greater vibration while increasing power of the driving source in the engaging unit having less vibration, and
when the vibration at the first engaging unit or the second engaging unit exceeds a preset upper limit, the output adjusting unit decreases the power of the driving source in the engaging unit having the greater vibration.

2. The driving force controlling apparatus for the vehicle according to claim 1, wherein when the vibration at the first engaging unit or second engaging unit exceeds the preset upper limit, the output adjusting unit increases the power of the driving source in the engaging unit having less vibration within a range of frequency lower than the upper limit.

3. The driving force controlling apparatus for the vehicle according to claim 2, wherein when the vibration at the first engaging unit or second engaging unit exceeds the preset upper limit, the output adjusting unit decreases the power of the driving source in the engaging unit having the greater vibration within a range higher than a preset lower limit where occurrence of discomfiting sound is prevented.

4. The driving force controlling apparatus for the vehicle according to claim 2, wherein when vibration at the first engaging unit or second engaging unit exceeds the preset upper limit, the output adjusting unit changes the power of the first driving source and the power of the second driving source so that output from the third output gear does not change.

5. The driving force controlling apparatus for the vehicle according to claim 2, wherein the output adjusting unit has a vibration generation map corresponding to a vehicle speed and torque at each of the engaging units, and changes the power of the first driving source and the power of the second driving source based on the vibration generation map.

6. The driving force controlling apparatus for the vehicle according to claim 1, wherein when the vibration at the first engaging unit or second engaging unit exceeds the preset upper limit, the output adjusting unit decreases the power of the driving source in the engaging unit having the greater vibration within a range higher than a preset lower limit where occurrence of discomfiting sound is prevented.

7. The driving force controlling apparatus for the vehicle according to claim 6, wherein when vibration at the first engaging unit or second engaging unit exceeds the preset upper limit, the output adjusting unit changes the power of the first driving source and the power of the second driving source so that output from the third output gear does not change.

8. The driving force controlling apparatus for the vehicle according to claim 6, wherein the output adjusting unit has a vibration generation map corresponding to a vehicle speed and torque at each of the engaging units, and changes the power of the first driving source and the power of the second driving source based on the vibration generation map.

9. The driving force controlling apparatus for the vehicle according to claim 1, wherein when vibration at the first engaging unit or second engaging unit exceeds the preset upper limit, the output adjusting unit changes the power of the first driving source and the power of the second driving source so that output from the third output gear does not change.

10. The driving force controlling apparatus for the vehicle according to claim 9, wherein the output adjusting unit has a vibration generation map corresponding to a vehicle speed and torque at each of the engaging units, and changes the power of the first driving source and the power of the second driving source based on the vibration generation map.

11. The driving force controlling apparatus for the vehicle according to claim 1, wherein the output adjusting unit has a vibration generation map corresponding to a vehicle speed and torque at each of the engaging units, and changes the power of the first driving source and the power of the second driving source based on the vibration generation map.

12. A driving force controlling apparatus for a vehicle comprising:
a first driving source which outputs power;
a first output gear which outputs power from the first driving source;
a second driving source which outputs power;
a second output gear which outputs power from the second driving source;
a third output gear which outputs power to a driving wheel;
a first engaged assembly including the first output gear meshed with the third output gear;
a second engaged assembly including the second output gear meshed with the third output gear; and
circuitry configured to determine vibration of the first engaged assembly and the second engaged assembly and adjusts the power of the first driving source and the power of the second driving source, wherein
the circuitry is configured to decrease power of the driving source in whichever of the first and second engaged assemblies has greater vibration while increasing power of the driving source in the engaged assembly having less vibration, and
when the vibration at the first engaged assembly or the second engaged assembly exceeds a preset upper limit, the circuitry is configured to decrease the power of the driving source in the engaged assembly having the greater vibration.

* * * * *